(12) United States Patent
Anderson

(10) Patent No.: US 9,628,869 B1
(45) Date of Patent: Apr. 18, 2017

(54) PLAY TIME ADJUSTMENT OF ASSETS FOR TARGETED ASSET SYSTEM

(75) Inventor: Bruce J. Anderson, Chesterfield, NJ (US)

(73) Assignee: INVIDI Technologies Corporation, Princeton, NJ (US)

( * ) Notice: Subject to any disclaimer, the term of this patent is extended or adjusted under 35 U.S.C. 154(b) by 710 days.

(21) Appl. No.: 12/559,292

(22) Filed: Sep. 14, 2009

Related U.S. Application Data

(60) Provisional application No. 61/096,432, filed on Sep. 12, 2008.

(51) Int. Cl.
*H04N 7/10* (2006.01)
*H04N 21/81* (2011.01)

(52) U.S. Cl.
CPC .................................. *H04N 21/812* (2013.01)

(58) Field of Classification Search
CPC ......... H04N 21/25891; H04N 21/4331; H04N 21/4532; H04N 21/812
USPC ...................................................... 725/32–36
See application file for complete search history.

(56) References Cited

U.S. PATENT DOCUMENTS

| | | | |
|---|---|---|---|
| 7,188,354 B2* | 3/2007 | Lyons et al. | 725/32 |
| 2008/0235722 A1* | 9/2008 | Baugher et al. | 725/32 |
| 2009/0164601 A1* | 6/2009 | Swartz | 709/217 |
| 2009/0235308 A1* | 9/2009 | Ehlers et al. | 725/34 |
| 2015/0003810 A1* | 1/2015 | Plotnick et al. | 386/249 |

* cited by examiner

*Primary Examiner* — Gigi L Dubasky
(74) *Attorney, Agent, or Firm* — Marsch Fischmann & Breyfogle LLP; Kent A. Fischmann

(57) ABSTRACT

Certain functionality related to delivery of targeted assets via a communications network, such as a broadcast cable television network, is accommodated by the use of squeezed assets. In one implementation, one or more squeezed assets (164A, 164B and 164C) are delivered during an asset insertion opportunity (162) such as during a commercial break of a programming channel. Each of the squeezed assets (164A, 164B and 164C) includes a squeezed informational content (168A, 168B and 168C) and padding (166A-166F). The padding (166A-166F) accommodates processing times associated with selecting and/or displaying targeted assets. In this regard, the amount and apportioning of padding (166A-166F) may be determined in relation to the operating characteristics of the targeted asset system.

18 Claims, 10 Drawing Sheets

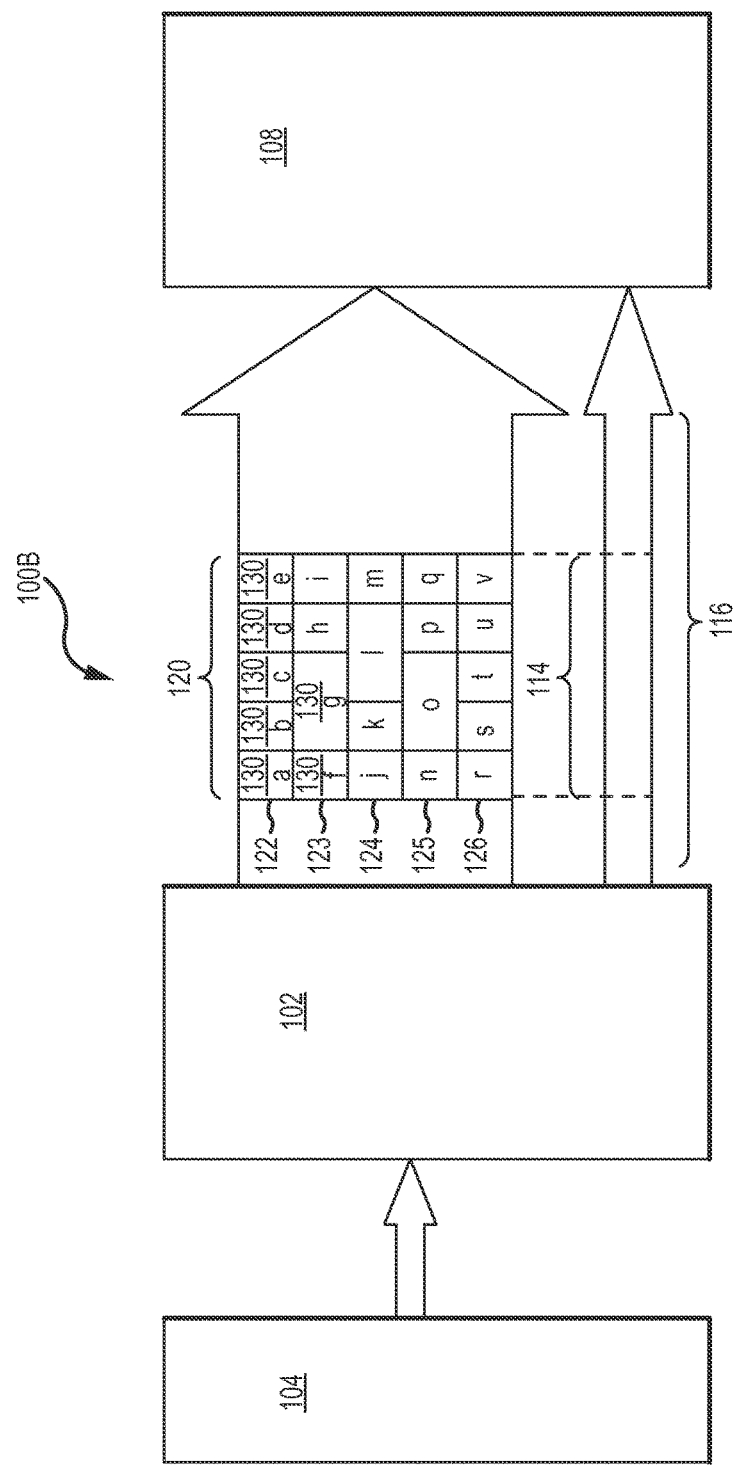

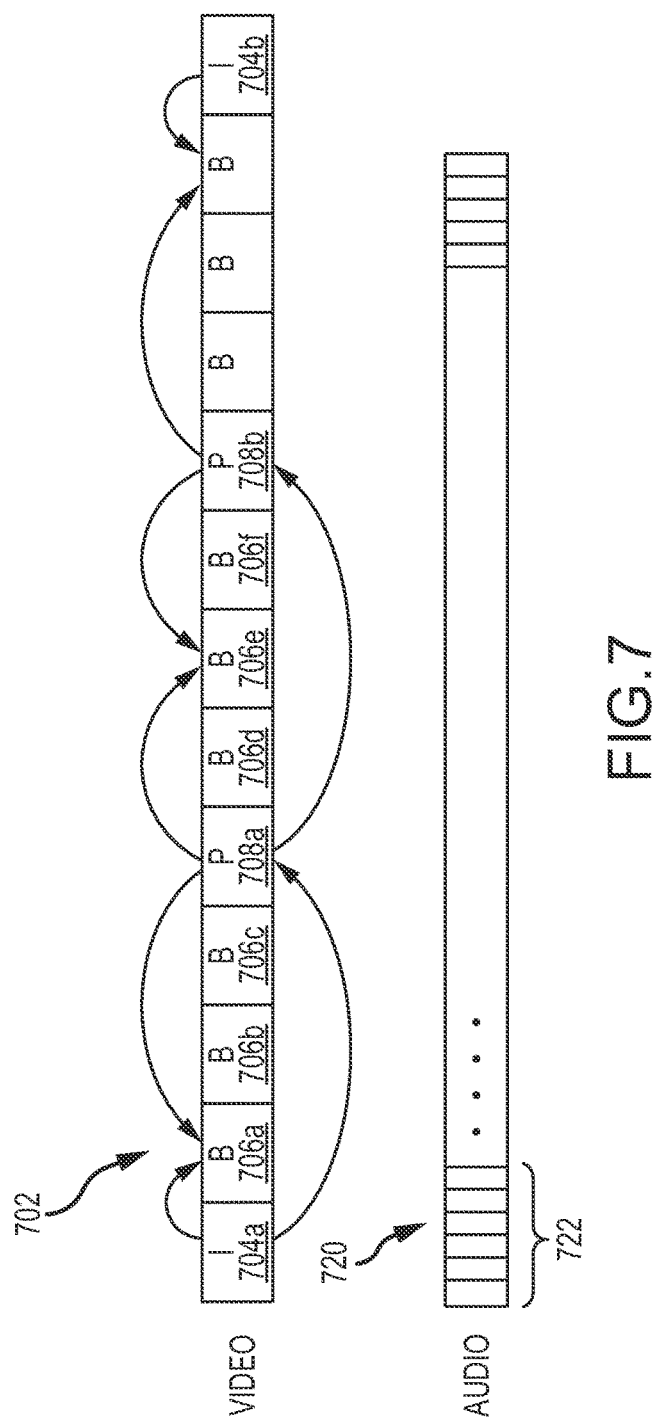

PLAY TIME ADJUSTMENT OF ASSETS FOR TARGETED ASSET SYSTEM

CROSS-REFERENCE TO RELATED APPLICATION

This application claims priority under 35 U.S.C. 119 to U.S. Provisional Application No. 61/096,432, entitled: "PLAY TIME ADJUSTMENT OF ASSETS FOR TARGETED ASSET SYSTEM," filed on Sep. 12, 2008, the contents of which are incorporated herein as if set forth in full.

FIELD OF THE INVENTION

The present invention is generally related to providing targeted content to users of a network. More specifically, the present invention relates to adjusting the active video play time of assets to facilitate various targeting functionality.

BACKGROUND

Broadcast networks often derive a substantial revenue stream from advertising. Traditionally, commercial time slots have been sold to advertisers based largely on crude demographic information. For example, a commercial for pet products might be shown during a nature show based on market research indicating that people who watch that type of program are likely to be pet owners. The pet product commercial would be displayed to all program viewers alike, regardless of whether a particular viewer did in fact own a pet. Under this paradigm, commercials could be scheduled for insertion into a broadcast stream ahead of time because all scheduling decisions were made long in advance of viewing by the network users.

More recently, it has become possible to gather information about individual network users and to use that information to target a particular asset to a particular user or set of users. For example, in a particular network environment, it may be possible to determine whether a given household subscribing to a cable television service includes a pet owner by examining credit card purchasing information for household members for pet-related purchases. Alternatively, similar information may be deduced from monitoring viewing behavior. During a commercial break in a given program, a pet product ad could be delivered to those subscribers deemed likely to be pet owners. Meanwhile, non-pet-owning viewers of the same program or channel could be shown other commercials more appropriate to those viewers. At the same time, the pet product ad could be shown simultaneously across different programs or channels to viewers who have been identified as pet owners. This latter concept, pioneered by Invidi Corporation of Princeton, N.J., can provide a larger receptive audience that might otherwise be difficult to reach.

A variety of mechanisms have been proposed for presenting targeted advertisements to users of a broadcast network. In one approach (referenced as the "forward-and-store" approach below), user equipment such as a set-top box stores commercials ahead of time and displays a selected commercial during a break in programming, optionally overriding what might otherwise be presented on a given network channel. Another method is to populate one or more dedicated channels with a variety of commercials and require the user equipment to "channel hop" during a commercial break to those network channels showing the most appropriate ads for a given user. Ideally, this channel hopping is invisible to the network user.

More broadly, various methods have been developed for targeting particular assets to particular users of a network. Information about a given network user may even be gathered in real time and used to select appropriate assets for delivery. For example, a user may interact with the network in ways that suggest certain characteristics, whether or not the user actually reveals any identifying information. In any case, the actual asset presented to a network user at any given time may depend on characteristics of the instant user. Thus, at least some asset selection decisions may be made just prior to presentation of the selected asset or assets. Moreover, even where decisions are made substantially ahead of time, it may be necessary to execute significant processing, e.g., related to insertion or channel hopping, at the time of asset presentation.

SUMMARY

Presenting targeted assets requires some amount of processing time, which may vary with a number of factors including: what targeting technology is employed (e.g., forward-and-store versus channel hopping), the complexity of the asset selection algorithm, whether to account for "who's watching now," the number of targetable assets, the available processing resources, and other factors. In some contexts, presenting a targeted asset may require more processing time than is available. For example, presenting a targeted asset may require accessing a different signal source, such as when a set-top box is tuned to a different channel of a cable television network to receive targeted ads. If a channel hop is initiated at the start of a commercial break (e.g., no sooner than the conclusion of the preceding programming segment), there may be a perceptible lag while the set-top box tunes to the new channel, with the result that a portion of the commercial message being shown on that channel is missed. Similar lags may be associated with insertion in forward-and-store contexts and with processing associated with just-in-time asset selection (e.g., in forward-and-store or channel hopping scenarios).

For at least these reasons, it may desirable to manipulate the length of an asset without substantially affecting its content. For example, the active portion of an asset might be shortened from its original run-time to fit an available presentation window. That is, the original asset may be shortened (e.g., by removing short video and audio segments in a manner that has minimal or substantially no perceptible impact) and padding (e.g., black video and silent audio) may be added to one or both sides of the asset so that the shortened and padded video has an overall run-time equal to the original asset. Alternatively, it may be possible in some cases to speed up presentation of the actual content of an asset while adding padding to maintain a fixed overall asset length. Furthermore, it may be desirable to provide a number of insertion points in an asset (e.g., within the added padding) to facilitate presentation of the asset to a user.

In accordance with one aspect of the present invention, a method is provided for use in targeting assets in a broadcast network. The method includes providing a targeted asset system wherein an asset is selected for presentation to a network user by matching targeting information associated with the asset to classification information associated with the network user. The duration of an active content portion asset (e.g., active video and corresponding audio) is modified to account for targeting processing that may include an asset matching processing and/or an asset presentation processing. The modified asset is then presented to the user. Modifying the duration of the asset may include receiving an asset that has informational content and an associated runtime or duration wherein the runtime has an original value and processing the active portion asset to change the runtime without substantially affecting the asset's informational content. For example, the active portion may be shortened ("squeezed") as discussed above or lengthened ("stretched"), e.g., to increase the nominal run length of default ads within a programming stream so as to accommodate other ad options requiring selection and/or presentation processing. An asset may be squeezed by removing content on a random or periodic basis or by intelligently selecting content for removal (e.g., recognizing a series of still frame video with a silent audio track and disproportionately removing content from such low impact segments). In the case of a squeezed active portion, the asset may be padded with neutral information so that the final squeezed and padded asset has a total run time approximately equal to the original runtime. The neutral information may be added to either or both ends of the assets (depending on where processing time is required for asset presentation or return to a programming stream) and may include, for example, black video information and/or silent audio information. The asset may include, a number of insertion points, which may be located within the neutral information of a padded asset. Such insertion points may relate to inserting the asset into a programming stream or joining a dedicated asset channel and may be defined in relation to a compression format.

In accordance with another aspect of the invention, a method for processing a digital bit stream that includes an encoded audiovisual asset is disclosed. The method includes receiving a digital bitstream having an encoded video track multiplexed with at least one encoded audio track, wherein the video track comprises a plurality of information frames and each audio track comprises a plurality of audio samples. The video and audio tracks may be separated, after which the video track may be processed in the encoded domain to remove one or more frames of information. The audio track or tracks made be processed in the sampling domain to remove audio samples from each audio track, after which the audio track(s) may be multiplexed with the modified video tracks. More specifically, processing the video track may include identifying removable information frames in the video track and removing one or more of the removable information frames from the video track. Similarly, processing each audio track may include decoding the audio track into a plurality of audio samples, removing audio samples from each audio track, and re-encoding each audio track. The audiovisual asset and may further be padded with blank information, which may include adding blank video information to at least one end of the video track and/or adding silent audio information to a least one end of an audio track. In one embodiment, the audiovisual asset may be encoded according to an MPEG compliant standard, and removing video information may include identifying and removing B-frames the encoded asset. Furthermore, processing and audio track may include decoding the audio track into multiple audio samples, periodically removing audio samples from the audio track, and re-encoding the audio track.

In accordance with another aspect of the invention, a system is provided for using squeezed assets to accommodate targeted asset processing. The system involves accessing a number of assets, wherein each asset has associated targeting information. The targeting information may be compared (e.g., at the head end or at a user equipment device) to one or more characteristics or classification parameters of a network user in order to select an asset for delivery to that network user. The asset is presented to the network user after first having its active content runtime reduced to accommodate a processing time needed to perform the comparison, selection, or presentation of the asset. Conveniently, this squeezing may be executed prior to delivery from the head end to a user equipment device. Furthermore, the asset may be squeezed in a manner that has minimal or substantially no impact on international content of the asset. The squeezed asset may also be padded (e.g., prior to delivery from the head end to a user equipment device) at one or both ends with neutral information and one or more insertion points may be provided in the asset padding.

According to another aspect of the present invention, a squeezed asset is used at customer premises equipment to implement targeted advertising. The utility involves receiving a squeezed asset at the customer premises equipment, where the squeezed asset includes informational content and neutral content. More specifically, the squeezed asset is obtained by compressing an original asset and adding a buffer of neutral content to at least one side of the squeezed asset where the buffer includes one or more insertion points. The squeezed asset is presented at the customer premises equipment by switching from a programming stream to the squeezed asset in coordination with one of the insertion points of the buffer. For example, the switching may involve switching from a programming channel to separate bandwidth of the network where the squeezed asset is transmitted in synchronization with the insertion opportunity. Alternatively, the switching may involve retrieving the squeezed asset from storage at the user equipment device. The user equipment device is then operated to display at least a portion of the neutral content as well as the informational content of the squeezed asset.

In accordance with another aspect of the invention, a method is provided for targeting assets to users of a communication system wherein assets are matching users by comparing targeting information associated with the assets to classification information associated with the users. The method provides for modifying an asset at the head end to accommodate a targeting delay, transmitting the modified asset to a consumer premises equipment, and presenting the modified asset to the user via the consumer premises equipment. Modifying the asset may include reducing a duration of the asset and/or padding at least one end of the asset with neutral information. Padding the asset with neutral information may include adding blank video and/or silent audio information to the asset. In the case where the assets includes a digital bitstream such as an MPEG encoded stream, padding the asset may include adding one or more neutral I-frames to the asset. The padding may be enough to restore the asset to substantially its original duration. The padding may be divided evenly between two ends of the assets or may be configurably distributed.

According to another aspect of the invention, a utility is provided for implementing targeted asset delivery by using a squeezed asset in the programming stream to facilitate switches away from the programming stream. The utility includes receiving a first squeezed asset in a programming stream having informational content and neutral content, wherein the first squeezed asset is obtained by compressing and padding an original asset. Padding the original asset may include adding a buffer of neutral content to a least one side of the asset. The buffer may include one or more insertion points. A second squeezed asset may be presented by switching from the programming stream to the second squeezed asset in coordination with one of the insertion points. The informational content of the second asset, as well as some of the neutral content, may then be displayed to the user. In one implementation, such switching involves accessing an asset delivery channel of the broadcast network system to receive the second asset. Squeezed assets may be provided in multiple asset delivery channels to define an asset flotilla. Such a flotilla may include a sequence of assets in each asset delivery channel where the amount of squeezing, if any, and the amount and distribution of padding may be a function of the position of an asset within the sequence. Alternatively, the utility may include selecting the second asset from a plurality of stored assets while displaying a portion of the neutral content of the first asset.

In certain contexts, a network operator might want to insert a particular asset with a particular run-time into a predetermined time slot in the network such that the particular run time is not equivalent to the predetermined time slot. A network performing targeted advertising is an illustrative context. Generally, targeted advertising is a means of providing particular advertising to end-users who are more desirable than other end-users. An end-user might be more desirable because of a particular age bracket, content viewing habits, or other conditions. Once the network determines which set of conditions the end-user possesses, the network can then direct an appropriate advertisement to the end-user based on the set of conditions. Computer software can be utilized to determine which conditions a particular end-user possesses and direct appropriate advertisements to the end-user. Because the above processes occur in real-time, the software must run between the times that assets are being inserted into the network. Consequently, some length of time is necessary to allow the software to run. However, most assets are produced having run-times equivalent to predetermined time-slots in the network. In such a situation, no time would exist for the software to run and perform the targeted advertising.

The present invention is directed to methods, systems and apparatuses for allowing the run-times of particular assets to be altered before insertion into various transmission networks, such as but not limited to, cable television networks, broadcast television networks, radio networks, and the Internet. Generally, the assets involved have already been completed and arrive at the head-end or end-user with some predetermined run-time. Thus, the present invention functions to take a completed asset with a particular run-time and alter the run-time at, but not limited to, the head-end or end-user. Altering the run-time of a completed asset would be extremely useful in situations where, for instance, additional functions or programs require time to run before an asset is inserted into a network.

According to one aspect of the present invention, a method and apparatus are provided for use in altering the run-time of an asset for insertion into a transmission network. The utility generally involves receiving an asset with a first run-time for insertion into a transmission network, identifying a second run-time with a different length than the first run-time, editing the asset so that the asset has the second run-time instead of the first run-time, and inserting the asset into the transmission network. For example, the assets capable of being modified include but are not limited to video streams, audio streams, data streams, etc. These assets can be modified at any number of locations, including the head-end and in the equipment of the end-user of the network.

According to another aspect of the present invention, a system is disclosed for providing targeted advertising to individual end-users. The system involves providing a cable television network having at least one designated time-slot for transmitting advertisements to end-users, receiving at least one advertisement having audio and video content in the network, the at least one advertisement having a first run-time, removing audio and video content from the at least one advertisement so that a portion of at least one of the beginning and the end of the at least one advertisement is devoid of audio and video content, choosing a targeted advertisement to be transmitted to an individual end-user during the portion of the advertisement that is devoid of audio and video content; and transmitting the targeted advertisement to the individual end-user during the at least one designated time-slot.

According to another aspect of the present invention, a method is disclosed for use in providing targeted advertising to individual end-users. The method includes receiving at least one advertisement at the set-top terminal of an individual end-user in a cable television network, the at least one advertisement having audio and video content, and further having a portion of the beginning or end thereof being devoid of audio and video content, choosing a targeted advertisement to be transmitted to an individual end-user during the portion of the at least one advertisement being devoid of audio and video content, and transmitting the targeted advertisement to the individual end-user during at least one designated time-slot of the cable television network.

According to another aspect of the present invention, an apparatus is disclosed for use in providing targeted advertising to individual end-users. The apparatus includes an input port for receiving an advertisement that has at least a portion of the beginning or end thereof devoid of audio and video content, a processor for selecting a targeted advertisement for the individual end-user, the processor being adapted to run during the portion of the advertisement that is devoid of audio and video content, and an output port for transmitting the targeted advertisement to a screen for viewing by the individual end-user.

BRIEF DESCRIPTION OF THE DRAWINGS

For a more complete understanding of the present invention and further advantages thereof, reference is now made to the following detailed description taken in conjunction with the drawings in which:

FIGS. 1A and 1B illustrate targeted asset systems in accordance with the present invention;

FIGS. 7-8B illustrate exemplary structures of a squeezed and padded asset in accordance with the present invention.

DETAILED DESCRIPTION

Figure 1A:
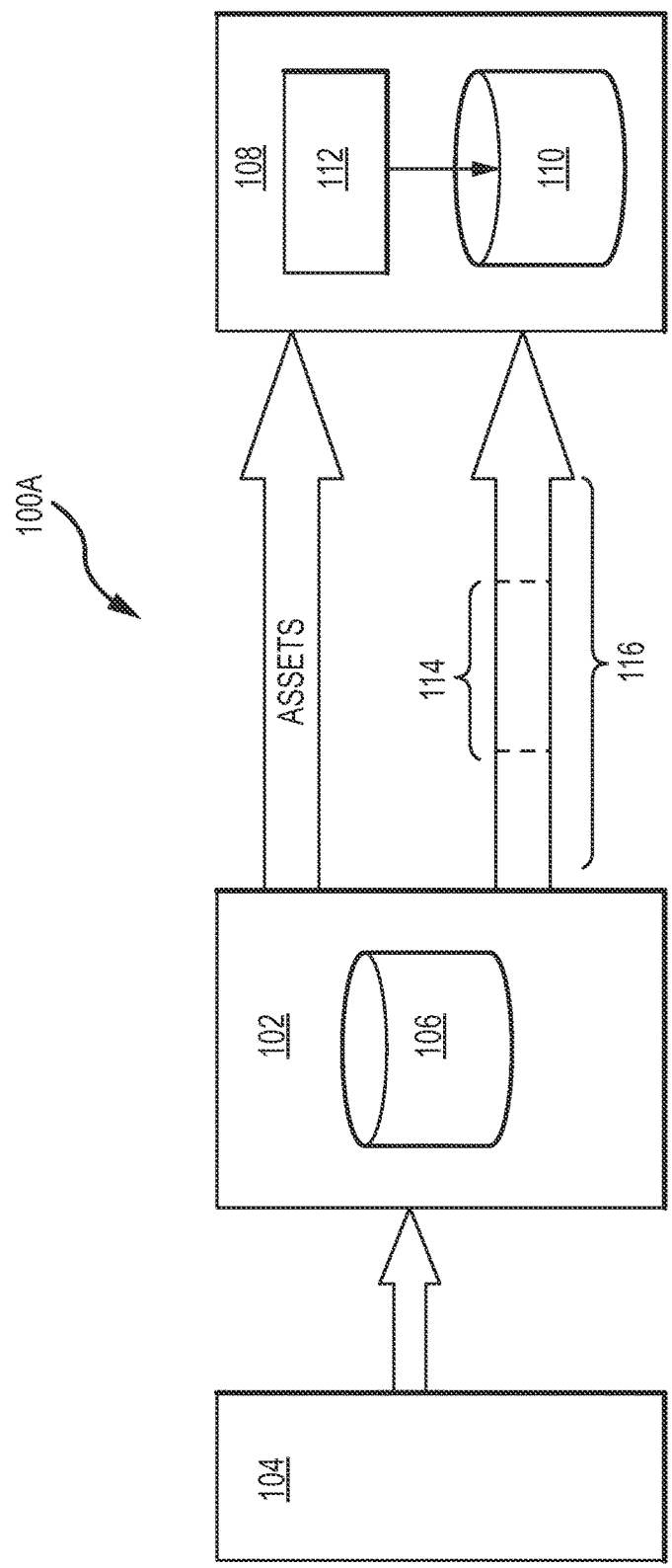

The present invention relates to systems and methods for delivery of targeted assets in a communications network. In particular, the invention relates to squeezing the duration of the informational content of the original asset and then padding the squeezed asset with network content so that the padded, squeezed asset has an overall duration substantially equal to the original asset. This accommodates various processing related to presenting targeted assets.

The invention has particular application with respect to networks where content is broadcast to network users; that is, the content is made available via the network to multiple users without being specifically addressed to individual user nodes in point-to-point fashion. In this regard, content may be broadcast in a variety of networks including, for example, cable and satellite television networks, satellite radio networks, IP networks used for multicasting content and networks used for podcasts or telephony broadcasts/multicasts. Content may also be broadcast over the airwaves. In various contexts, the content may be consumed in real time or stored for subsequent consumption. Thus, while specific examples are provided below in the context of a cable television network for purposes of illustration, it will be appreciated that the invention is not limited to such contexts but, rather, has application to a variety of networks and transmission modes.

The targeted assets may include any type of asset that is desired to be targeted to network users. For example, targeted assets may include advertisements, internal marketing (e.g., information about network promotions, scheduling or upcoming events), public service announcements, weather or emergency information, or programming. The targeted assets may be independent or included in a content stream with other assets such as untargeted network programming. In the latter case, the targeted assets may be interspersed with untargeted programming (e.g., provided during programming breaks) or may otherwise be combined with the programming as by being superimposed on a screen portion in the case of video programming. In particular, the asset squeezing functionality described below is advantageous with respect to targeting assets that are inserted into asset delivery windows (e.g., commercial breaks) having a predetermined time window.

In the description below, specific examples are provided in the context of targeted assets provided during breaks in television programming. While this is an important commercial implementation of the invention, it will be appreciated that the invention has broader application. Thus, distinctions below between "programming" and "assets" such as advertising should not be understood as limiting the types of content that may be targeted or the contexts in which such content may be provided.

Users employ a communications network, and network operators derive revenue, based on delivery of desirable content or programming. The stakeholders in this regard include programming providers, asset providers such as advertisers (who may be the same as or different than the programming providers), network operators such as Multiple Systems Operators (MSOs), and users—or viewers in the case of television networks. Programming providers include, for example: networks who provide series and other programming, including on a national or international basis; local affiliates who often provide local or regional programming; studios who create and market content including movies, documentaries and the like; and a variety of other content owners or providers. Asset providers include a wide variety of manufacturers, retailers, service providers and public interest groups interested in, and generally willing to pay for, the opportunity to deliver messages to users on a local, regional, national or international level. As discussed below, such assets include: conventional advertisements; tag content such as ad tags (which may include static graphic overlays, animated graphics files or even real-time video and audio) associated with the advertisements or other content; banners or other content superimposed on or otherwise overlapping programming; product placement; and other advertising mechanisms. In addition, the networks may use insertion spots for internal marketing as discussed above, and the spots may be used for public service announcements or other non-advertising content. Network operators are generally responsible for delivering content to users and otherwise operating the networks as well as for contracting with the networks and asset providers and billing. Users are the end consumers of the content. Users may employ a variety of types of use equipment devices (UEDs) including television, set top boxes, iPOD™ devices, data terminals, satellite delivered video or audio to an automobile, appliances (such as refrigerators) with built-in televisions, etc.

Assets can be provided via a variety of distribution modes including real-time broadcast distribution, forward-and-store, and on-demand delivery such as VOD. Real-time broadcast delivery involves synchronous delivery of assets to multiple users such as the conventional paradigm for broadcast radio or television (e.g., airwave, cable or satellite). The forward-and-store mode involves delivery of assets ahead of time to UEDs with substantial storage resources, e.g., a DVR or data terminal. The asset is stored for later display, for example, as prompted by the user or controlled according to logic resident at the UED and/or elsewhere in the communications network. The on-demand mode involves individualized delivery of assets from the network to a user, often on a pay-per-view basis. The present invention can be utilized in connection with any of these distribution modes or others. In this regard, important features of the present invention can be implemented using conventional UEDs without requiring substantial storage resources to enhance even real-time broadcast programming, for analog and digital users.

FIG. 1A illustrates a system 100A for targeting assets to users of a broadcast network. A headend 102 receives assets and/or programming from an external source 104 such as an antenna, satellite feed, fiber optic cable, etc. Additionally or alternatively, the headend 102 may obtain broadcast content from storage media 106 such as via a video server. The headend 102 processes the received content for transmission to network users. Among other things, the headend 102 may be operative to amplify, convert and otherwise process the broadcast content signals as well as to combine the signals into a common cable for transmission to network users via consumer premises equipment (UED) 108. The UED 108 may include a television, data terminal, digital set top box, DVR or other terminal equipment. It will be appreciated that digital or analog signals may be involved in this regard. Programming and assets are broadcast to the UED according to a number of parameters that may include program schedules, asset targeting goals, and/or user classification information.

Asset targeting may be performed in a variety of ways. For example, regardless of how programming or other content is delivered, assets may be delivered using a forward-and-store methodology. The UED 108 may include a storage medium 110 for storing a plurality of assets that are forwarded to the UED 108 by the headend 102 in advance of an asset insertion opportunity 114 (e.g., a commercial break in a programming stream 116). A processor 112 can then perform a comparison of user classification information to targeting information associated with each asset to select an appropriate asset from those stored on the storage medium 110 for presentation. This method allows an asset scheduling decision to be made just before an asset is displayed, which in turn may increase the accuracy of the selection. For example, the processor 112 may track user inputs at the UED 108 to determine classification information related to a user of the UED 108 at a time of interest (e.g., a time near an asset insertion opportunity). Additionally or alternatively, user classification information may be derived from previously obtained information about a user (e.g., consumer, purchasing, or marketing information associated with a subscriber household). This classification information may be compared to targeting information for each of the previously stored assets. Based on this comparison, an asset may be selected for presentation at the UED 108. When an asset insertion opportunity 114 appears, the UED 108 may present the selected asset to the network user.

FIG. 1B illustrates another system 100B for providing targeted assets in a broadcast network that involves using one or more network channels (e.g., bandwidth segments) for asset delivery. In this embodiment, the headend 102 creates a flotilla 120 of assets 130a-130v to be broadcast across one or more channels 122-126 during an asset insertion opportunity 114 such as a commercial break in programming 116. The flotilla 120 may be populated with assets based on a targeting scheme similar to that described above, wherein asset targeting information is compared to classification information of one or more network users. More broadly, assets may be selected for inclusion in the flotilla 120 based on information received from one or more UEDs 108. For example, each UED 108 may "vote" for particular assets based on characteristics of network users associated with each UED 108. Those assets receiving the most votes may then be used to populate the flotilla 120. In any case, multiple assets may be scheduled for broadcast on the one or more asset presentation channels 122-126 during an asset insertion opportunity 114.

Figure 2A:
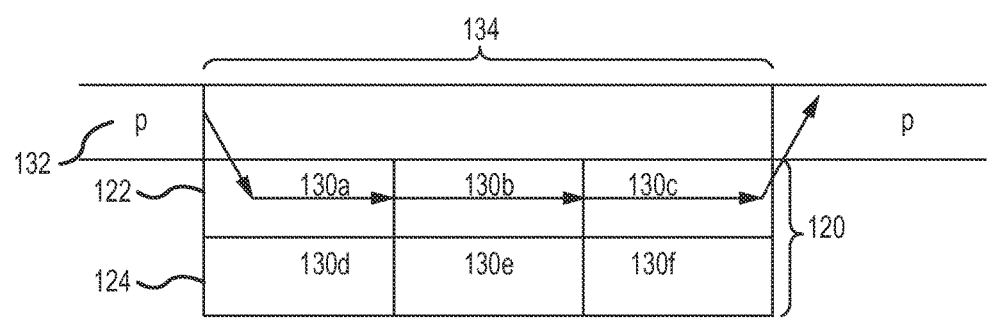
FIGS. 2A and 2B illustrate processes for navigating across a flotilla of assets in accordance with the present invention.
Figure 2B:
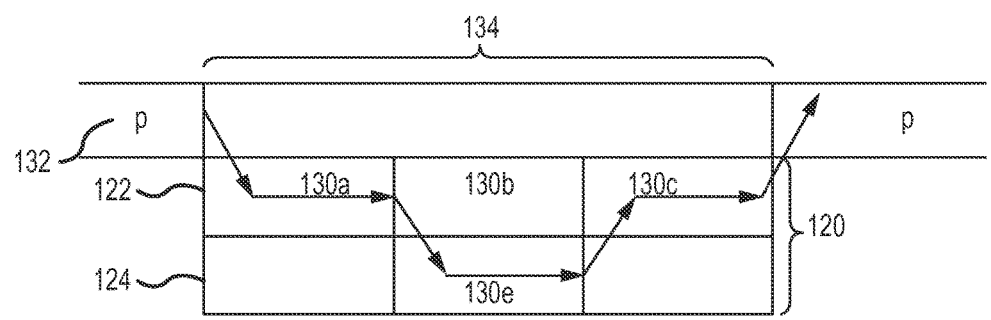

FIGS. 2A and 2B illustrate two examples of the flotilla method of targeting assets to network users. At the beginning of the asset insertion opportunity 134, the UED 108 tunes away from the programming channel 132 to the asset channel 122, 124, or 126 showing the asset selected for presentation at that UED 108. When the flotilla 120 includes more than one asset presentation channel 120, 122, 124, the UED 108 may compare user classification information with targeting information for each asset available at a given time slot and subsequently select a particular asset by tuning to a particular asset presentation channel. Similarly, when the asset insertion opportunity includes more than one time slot, the UED 108 may tune to a single asset presentation channel for the entire asset insertion opportunity 134 (see FIG. 2A), or it may "hop" from one asset presentation channel to another for each time slot to access the most appropriate asset available for each time slot (see FIG. 2B). At the end of the asset insertion opportunity 134, the UED 108 tunes back to the programming channel 132. These channel changes may be invisible to the network user; for example, a channel display on a set-top box may continue to display the number of the programming channel 132 the user is watching regardless of the actual channel 120, 122, or 124 whose contents are being presented.

Regardless of how asset targeting is performed, a certain amount of processing time is required to complete the steps outlined above. These steps include comparing asset targeting information to user classification information, selecting an asset for presentation, and presenting the selected asset. Presentation of a targeted asset may require more time than presentation of a non-targeted asset. For example, in the channel-hopping or flotilla method described above, presenting a targeted asset requires that the UED 108 first tune to a different channel of the broadcast network. Also, it may be desirable to make asset targeting decisions (i.e., to perform the comparison and selection steps) as close to the asset insertion opportunity as possible to ensure that the user classification information being used is relevant to the actual network user at the time of the asset insertion opportunity.

Figure 3:
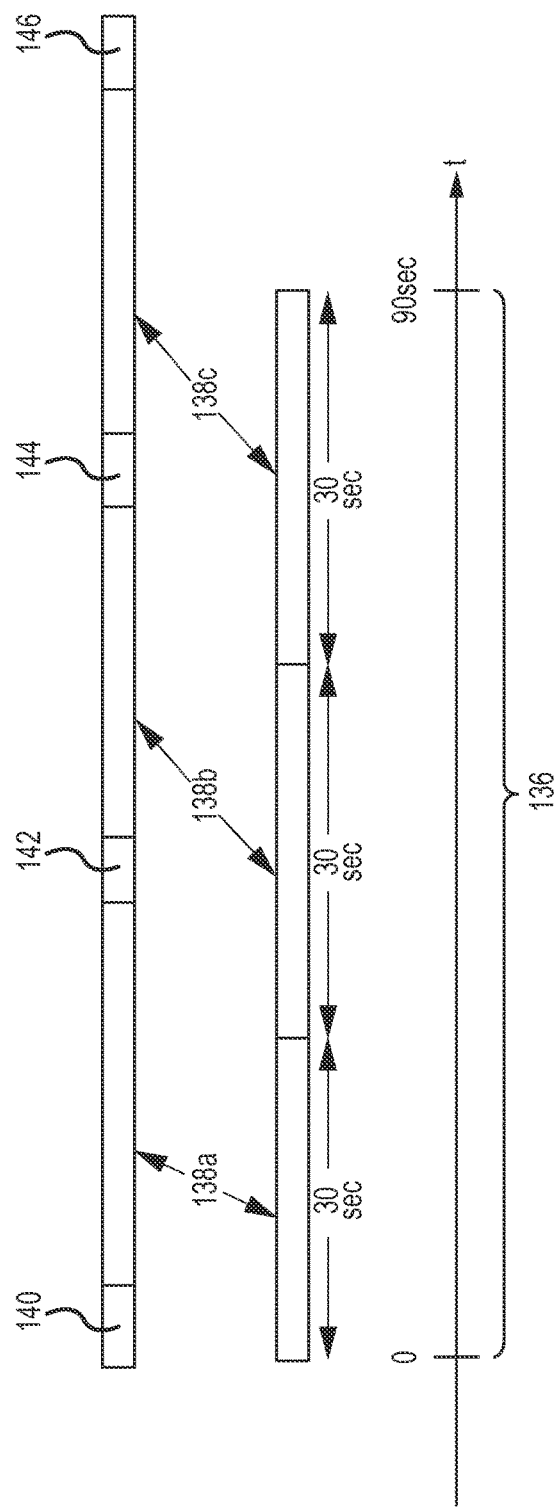
FIG. 3 illustrates the affect of targeting processing time in a targeted asset system.

FIG. 3 is a timing diagram of an exemplary asset insertion opportunity 136 having a total length of 90 seconds. The asset insertion opportunity allows for the presentation of three assets 138a-138c each having a duration of 30 seconds. However, when asset targeting is used, a processing time may be associated with one or more of the assets. For example, a UED may employ the flotilla Method described above to switch to an asset presentation channel of the broadcast network at least at the beginning and end of an asset presentation opportunity. This would involve a processing time 140-146 at least at the beginning and end of the break in programming to account for tuning the UED to different channels. Additionally or alternatively, there may be a processing time 140-146 associated with the beginning of each asset to account for making targeting decisions on the fly and/or presenting selected assets, such as when the flotilla method is used and the UED tunes to a different channel for each time slot in an asset insertion opportunity. When these processing times 140-146 are considered, the time required to present the three assets 138a-138c to a network user exceeds the 90 second window of the asset presentation opportunity.

This situation may produce any of several undesirable results depending on how it is handled. If the three assets 138a-138c are broadcast in sequence during the 90-second asset insertion opportunity according to the flotilla method, the delay required for the UED to tune to the appropriate asset delivery channel will cause the first portion of at least the first asset 138a to be missed. That is, the UED will begin displaying the asset 138a some time after the beginning of the asset 138a. Meanwhile, a targeted asset, default asset or other content on the original programming channel may be briefly displayed and then abruptly interrupted. Similarly, tuning back to the programming channel at the end of the asset presentation opportunity 136 may entail cutting off either the end of the final asset 138c or the beginning of any subsequent programming. The forward-and-store method of asset targeting can also suffer from these problems when targeting decisions are made just prior to asset presentation. That is, any processing that must occur during the 90-second break in programming may cause portions of the assets and/or programming to be cut off.

Figure 4:
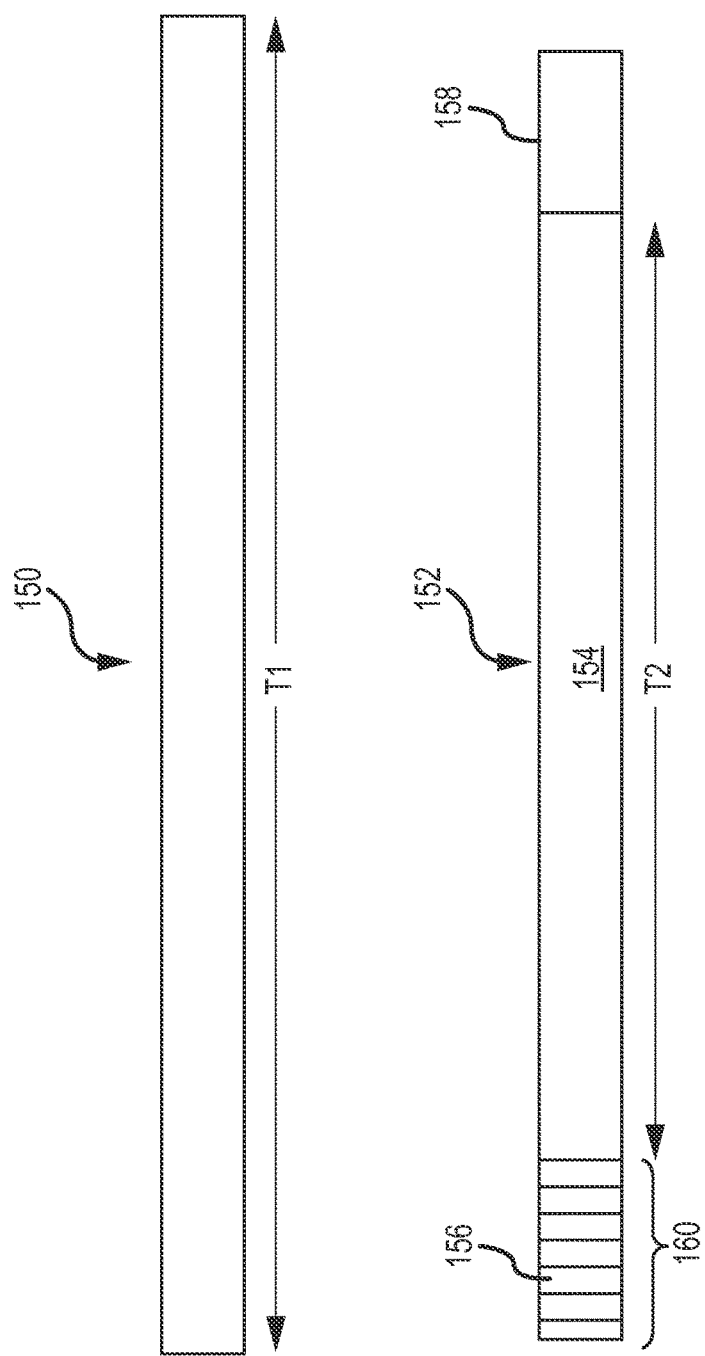
FIG. 4 illustrates an original asset and a squeezed and padded asset in accordance with the present invention.

These and other issues may be addressed by employing an asset squeezer to compress targetable assets and thereby make room for the processing times described above. FIG. 4 depicts various aspects of an asset in its original 150 and squeezed 152 forms. The original asset 150 has a duration T1 during which its informational content may be presented. The squeezed asset 152 includes an informational portion 154 having substantially the same informational content as the original asset 150, but with a duration T2 that is shorter than the original duration T1. For example, the squeezed duration T2 may be shorter than the original duration T1 by at least a processing time TP. To ensure a pleasing experience for the user, the informational content may be compressed by removing low-impact information.

Furthermore, the squeezed asset 152 may include neutral information 156, 158 at one or both ends. This neutral information 156, 158 may be used, for example, to pad the squeezed asset 152 to a total length substantially equal to the original duration T1. If the original asset 150 is an audiovisual asset such as a television commercial, the neutral information 156, 158 may include silent audio information and/or blank (e.g., black) video information. To provide a more pleasing user experience, the neutral information contained in each squeezed asset may further include a number of insertion points 160 for seamlessly "splicing" an asset into a programming stream.

Figure 5:
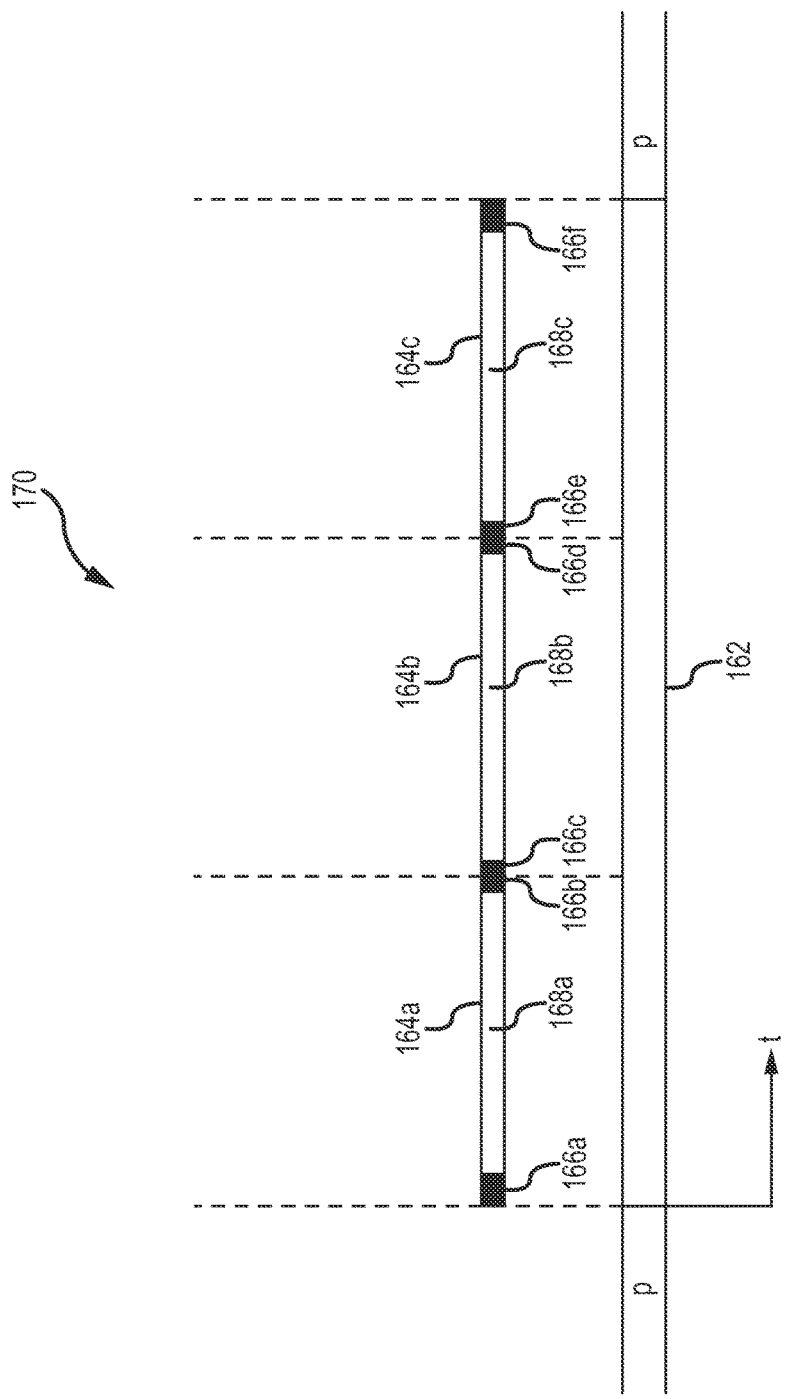
FIG. 5 illustrates insertion of squeezed and padded assets into a break in a programming stream in accordance with the present invention.

The problem of cutting off informational content described above can be avoided when squeezed assets are inserted into a programming stream. For example, FIG. 5 illustrates a timing diagram 170 for presenting squeezed assets. Three squeezed assets 164a-164c each have a total duration of 30 seconds. Each squeezed asset 164a-164c may also have informational content 168a-168c and, optionally, neutral information 166a-166f at one or both ends. At the beginning of an asset insertion opportunity 162, a UED such as the UED 108 of FIGS. 1A and 1B may display neutral information such as blank video and/or silent audio while an asset targeting decision is made, or while the UED tunes to an appropriate asset presentation channel.

In the context of a flotilla or channel-hopping asset targeting system, the squeezed assets 164a-164c may be presented on one or more asset presentation channels, beginning with the neutral information associated with the start of the first asset 164a. As the first channel hop is completed, the UED begins to present the squeezed asset 164a. When the squeezed asset 164a has a sufficient amount of neutral content 166a at the beginning, the operation of tuning the UED to the appropriate asset presentation channel is completed before the informational content 168a begins broadcasting. Thus, for the brief time while the targeting operation is performed, a network user receives only neutral information such as a black screen. For each subsequent channel change or targeting procedure, neutral information can be displayed while the system is performing the necessary processing to select and present content to individual network users. As noted above, channel hopping may occur only at the beginning and end of a commercial break, or may also occur within the break. In this regard, assets may be selectively squeezed, and padding may be apportioned in relation to the structure of the flotilla and an asset's position within the flotilla.

In some systems, squeezed assets may not be padded with neutral information. For example, a UED in a forward-and-store system (e.g., the UED 108 of FIG. 1A) may be configured to generate neutral content for display when needed. In this case, it may still be useful to squeeze assets to compress their duration without substantially affecting their informational content. The asset squeezing operation may be performed at the UED or may be performed at the headend; this latter method has the added advantage of reducing storage space requirements and processing capabilities needed at the UED.

Further, although many of the examples herein assume that it is desired to reduce the duration of an asset to account for processing times associated with asset targeting, in some cases it may be desirable to increase the total duration of an asset. For example, an asset may have an original length that is shorter than a time slot into which the asset is scheduled. In this case, the asset may be padded with neutral information as described above. Additionally or alternatively, the informational content of the asset may be stretched or padding may be added to unmodified informational content to result in a stretched asset. For example, such stretching may accommodate processing associated with asset targeting where the asset presentation opportunity has a sufficient or flexible time window.

Figure 6:
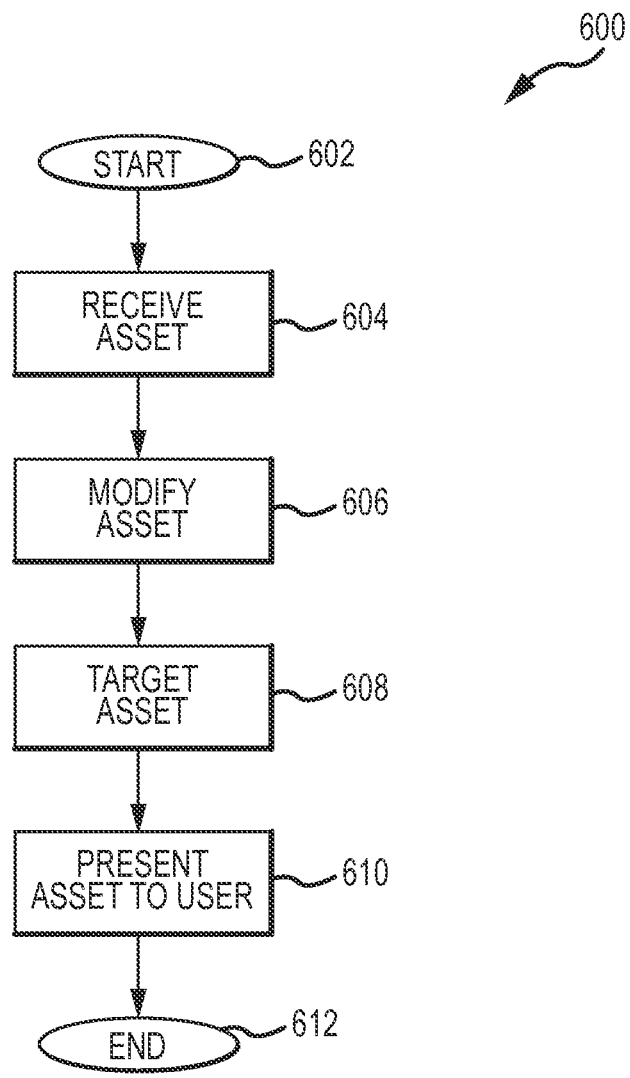
FIG. 6 is a flowchart illustrating a process for using squeezed assets in a targeted asset delivery system in accordance with the present invention.

FIG. 6 illustrates an exemplary process 600 for targeting assets to users of a broadcast network. The process 600 begins when an asset is received 604 from any source as described above. The asset is then modified 606 to accommodate the requirements of the targeting system. Although the modification step 606 is referred to as "squeezing" the asset, this step may include squeezing, stretching, and/or padding the asset as needed to prepare the asset for use in the targeted asset delivery system. Furthermore, the targeting operation 608 may be performed before, during, or after the squeezing operation 606. Targeting 608 the asset to a network user may include comparing targeting information associated with the asset to classification information associated with a network user and selecting an asset for presentation based on that comparison. An exemplary asset targeting system is described in U.S. patent application Ser. No. 11/331,835, filed Jan. 12, 2006, and entitled "Content Selection Based on Signaling from Customer Premises Equipment in a Broadcast Network," which is incorporated herein by reference. Finally, the selected asset is presented 610 to the network user.

Squeezing an asset may include removing video and/or audio information from the asset. For example, it may be desirable to squeeze a 30-second asset down to 29 seconds. This may be accomplished in a variety of ways. Removal of video information may be done intelligently, for instance by finding and removing low-impact video frames, such that removing video information does not produce a noticeable effect to the viewer. Alternatively, video information may be removed on a random or periodic basis. Similarly, audio information may be removed randomly, periodically, or intelligently. Ideally, audio information is removed in such a way as to maintain the correspondence between video and audio (i.e., lip sync). Audio information is typically stored at a high sampling rate compared to video information. In this regard, audio may be removed in chunks that correspond to removed video information, or it may be removed in smaller, more evenly spread units.

Moreover, the processes of deleting audio and video content, as well as adding padding can be performed in relation to content in a compressed or uncompressed domain. In this regard, the asset may initially be recorded at a high data rate. For example, each video frame may be fully described in digital data and the audio information may be sampled at a high frequency. In order to reduce the bandwidth required to transmit the asset, the audio and visual information may be compressed using known compression techniques to form a transport stream. The transport stream is encoded and inserted into designated transmission bands, generally at a head end or other network platform in the case of a cable television network. Packetized data track may also be associated with the transport stream where each packet has a time stamp or other temporal reference to maintain correspondence to the video and audio information. It will be appreciated that the squeezing functionality can be performed at any stage in this process with respect to compressed or uncompressed information. Moreover, though it is desired to maintain lip sync, it is not necessary that the audio and video information be processed identically or that each be processed in the same (e.g., compressed or uncompressed) domain. This can be better understood in light of the following example.

FIG. 7 gives an example of squeezing an asset without substantially affecting its informational content. For purposes of illustration, squeezing an MPEG-type audiovisual asset is described. An MPEG-encoded asset 700 may include one video stream 702 and at least one corresponding audio channel 720. Although only a single audio channel is shown, it will be appreciated that one or more "secondary audio programming" channels are commonly provided. In such cases, lip sync may be addressed with respect to each channel. Moreover, parallel data tracks may also be provided (e.g., to deliver metadata to the UED or collect data at the UED, for example, based on user inputs in an interactive context). In some cases, it is important to maintain time correspondence between the data of the data track and the content of the audio and/or video tracks as will be discussed below.

The video stream 702 may include three types of frames known as I-frames, B-frames, and P-frames. I-frames, or intra frames, describe a complete video frame and contain the most information of the three types. P-frames, or predicted frames, are coded with reference to a previous image (either an I-frame or another P-frame). B-frames, or bidirectional frames, are coded with reference to images in both directions and thus contain the least amount of information. Put another way, B-frames offer the greatest data compression, while I-frames offer the least data compression. Squeezing an asset 700 may include removing one or more B-frames $704a$-$704g$ (e.g., every $n^{th}$ B-frame where n is selected in relation to the amount of squeezing desired). Because the B-frames $704a$-$704g$ are not referenced by any other frames in an MPEG-encoded audiovisual stream, they can be removed without creating observable glitches or artifacts in video that would be disagreeable to a viewer. Conversely, stretching an asset may include duplicating B-frames and inserting the duplicate frames into the video stream 702.

Squeezing an asset may also include removing a corresponding amount of audio information. For example, an audio stream 720 may include a number of audio samples 722. Typically, audio sampling rates are orders of magnitude higher than video frames rates. For example, a video stream may have a frame rate of 30 frames per second, while an audio stream may have a sampling rate in the range of 48,000 samples per second. Accordingly, one method of removing audio information from an asset 700 without substantially affecting the informational content of the asset 700 includes decoding the audio portion 720 of the asset 700 into the sampling domain and subsequently removing an amount of audio information that corresponds to the amount of time dropped from the video stream 702. Because video information is quantized more coarsely than audio information, it is possible to determine precisely how much audio information to drop. For example, when one second of video information is dropped, the amount of audio information to drop will be exactly the sampling rate.

Audio samples may be dropped in any appropriate way so as to minimize the effect on the listener. For example, audio samples directly corresponding to the time interval of a dropped B-frame could be dropped to precisely mountain lip sync. Alternatively, the appropriate number of audio samples may be dropped uniformly across the length of the asset 700.

A minimal drift in lip sync may occur with each dropped B-frame (i.e., drift would occur and lip sync would be restored within the time frame between successive dropped B-frames), but this typically would not be noticeable to the viewer. In this regard, audio information may be processed in the sampling domain rather than in the encoded domain so as to avoid noticeable clicks and popping noises.

Figure 8A:
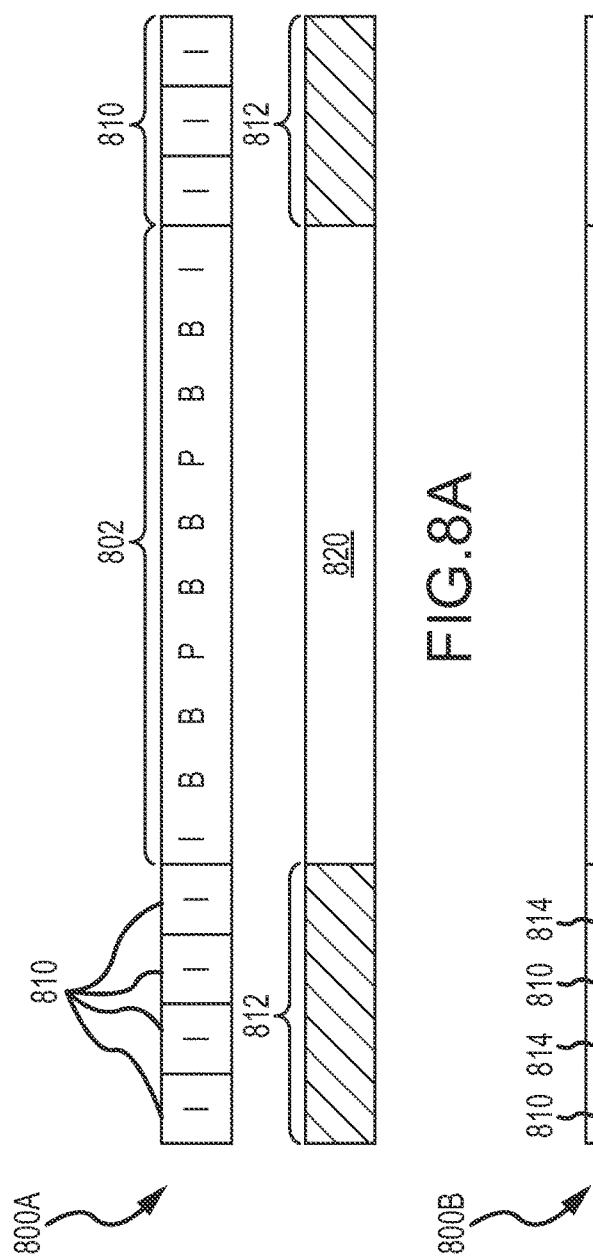

FIG. 8A gives an example of padding an asset with neutral information in the context of an MPEG-type audiovisual asset 800A. The asset 800A includes a squeezed video portion 802 and a squeezed audio portion 820. One or more black I-frames 810 may be generated and inserted at either or both ends of the video portion 802. Likewise, silent audio information 812 may be added to the audio portion 820 of the asset 800A in corresponding amounts. Because I-frames contain all the information necessary to produce a full picture without any glitches or visual artifacts, each I-frame 810 may provide an insertion point at which the asset 800A may be spliced into a programming stream.

More specifically, the video stream includes a Sequence Header which is found at the start of a group of Pictures (GOP). Typically, all GOPs start with an I-frame, or anchor-frame, but that is not required. So the decoder can look for a Sequence Header first and then it can start decoding the frame. It will not display anything until it has all the information necessary, so if the GOP started with a P or B-frame the decoder would not display anything until all the information needed (that is all the data referenced by the P or B-frame in other frames) has arrived a the decoder, so the fastest way to start decoding is by having an I-frame at the start of each GOP. Thus, including a number of I-frames facilitates rapid channel hopping or UED switching, but is not necessary to enable seamless channel hopping or UED switching.

Figure 8B:
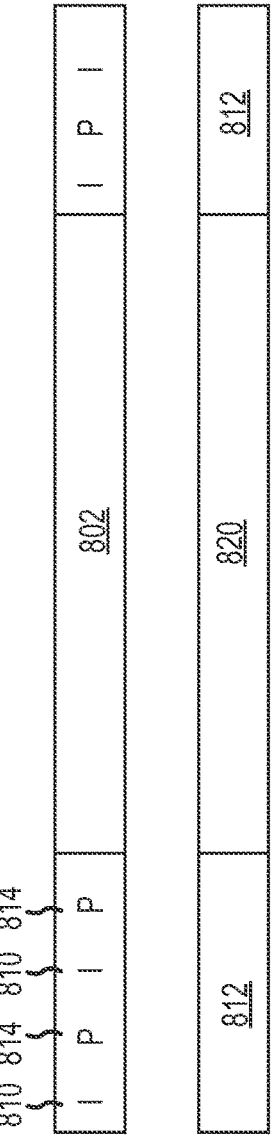

In another embodiment, the neutral video information may include alternating I-frames 810 and P-frames 814 (See FIG. 8B). This would create fewer (e.g., half as many) insertion points, but would also require less data since the P-frames 814 would offer a level of compression. It will be appreciated that any appropriate sequence of frames may be provided in this regard, though it is desirable to provide multiple insertion opportunities to accommodate varying targeting processing times. Moreover, it is desirable to provide corresponding padding and padding sequences as between assets on different asset channels of a flotilla and the corresponding programming channel, which may or may not form a part of the flotilla.

Figure 9:
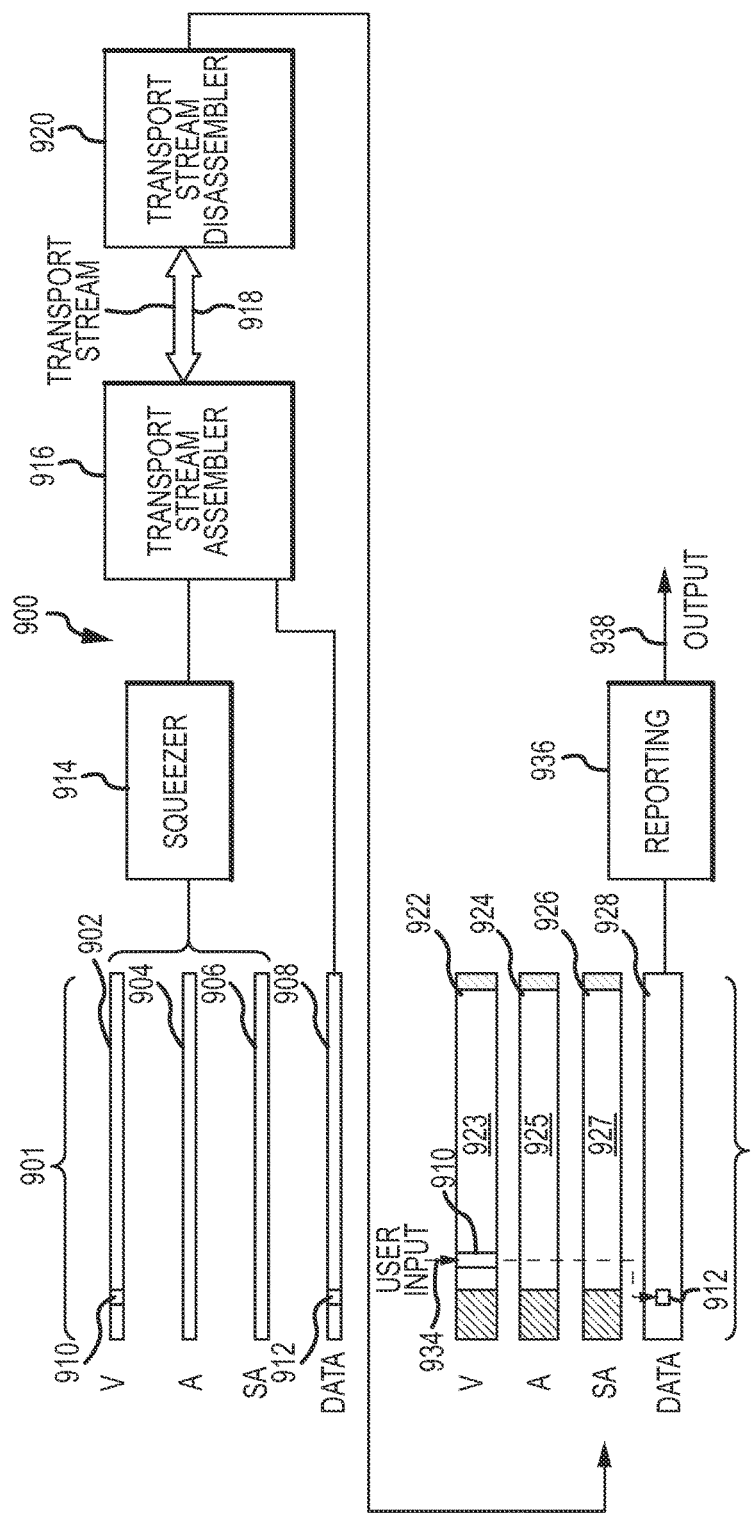
FIG. 9 illustrates an asset delivery system 900 in accordance with the present invention.

FIG. 9 illustrates an asset delivery system 900 in accordance with the present invention. The system 900 receives an original asset 901 including a video stream 902, a first audio channel 904 and at least one additional or secondary audio channel 906. The illustrated asset 901 further includes a data track 908. As discussed above, the data track 908 may include metadata corresponding to the audio or video information. In this case, the data track 908 includes a data segment 912 defining a user input opportunity 912. The input opportunity 912 in the illustrated asset 901 corresponds to input graphics 910 of the video stream 902. For example, the input segment 910 may be a video prompt with instructions to enter a designated input key or may be a product placement advertisement embedded within the asset 901. The data segment 912 may include a field for recording data reflecting any user input or lack thereof in relation to the video segment 910.

In the illustrated system 900, the video stream 902 and audio channels 904 and 906 are processed by a squeezer 914 that squeezes and pads the asset 901 as described above. The resulting squeezed and padded asset it further processed by a transport stream assembler 916. The transport stream assembler also receives the data track 908. The assembly 916 then codes the squeezed and padded asset as well as the data track for insertion into the designated bandwidth segment(s) so as to define the transport stream 918 for transmission across the network to a transport stream disassembler 920. In the case of a cable television network, the assembler 916 may be associated with a head end whereas the disassembler 920 may be associated with a user equipment device such as a digital set top box.

The transport stream disassembler 920 decodes the transport stream 918 to yield an asset 921 for playing at the user equipment device. The illustrated asset 921 includes a video stream 922, an audio channel 924, at least one secondary audio channel 926 and a data track 928. As shown, the video and audio portions of the asset 921 include squeezed informational content 923, 925 and 927 and padding indicated by shading. In this case, the padding is asymmetrically apportioned between the beginning and end segments of the asset 921.

Because the data transmitted across the network is generally packetized and need not be transmitted in synchronous mode, the data track 908 in the illustrated embodiment is not squeezed and generally corresponds to the delivered data track 928. As noted above, the input data segment 912 generally corresponds to the video segment 910. Thus, for example, the data segment 912 may include a time stamp or other temporal reference, for example, in a defined header field, that associates data segment 912 with video segment 910. However, the squeezing process modifies the temporal reference of the output video stream 922, which could render the time reference of the data segment 912 of the delivered asset 921 invalid. Accordingly, the illustrated system 900 addresses this issue so that such time references remain valid. This may be accomplished in any appropriate manner. For example, the data track 908 may be processed to modify the time references of the data packets in coordination with operation of the squeezer 914. Alternatively, events may be cross-reference as between the video stream 922 and the data track 912 by using references other than absolute time. For example, a user input, as generally indicated by arrow 934, may be referenced to a current video frame or set of frames. Similarly, the data segment 912 may be referenced to the video frame or set of frames. In this manner, the input 934 can be matched to video segment 910 and corresponding data segment 912 without regard to any time translation associated with the squeezing process. In this regard, the video segment 910 can be defined in a manner so that the segment 910 is not lost due to the squeezing process. For example, the segment 910 can extend across frame types that are not deleted or the frames associated with the segment 910 can be associated with a flag or other identifier that prevents the squeezer 914 from deleting such frames. In the context of such interactive functionality, the user input 934 or processed information associated with the user input 934 can be processed by a reporting module 936 to provide an output 938, for example, to the head end so as to enable the desired interactive functionality.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed:

1. A method for use in targeting assets in a network having scheduled asset delivery windows, comprising:
   providing a targeted asset system wherein an asset is selected for presentation to a network user during a given asset delivery window by matching targeting information associated with said asset to classification information associated with said network user, wherein said given asset delivery window has a fixed duration, and wherein said asset has an original duration equal to said fixed duration of said given asset delivery window;
   receiving said asset having an active portion with an active portion run-time, wherein said active portion run-time is comprised of a plurality of frames;
   modifying said original duration of said asset to accommodate a processing time for targeting related processing such that a duration of said modified asset duration and said processing time is at least equal to said original duration of said asset, wherein said targeting related processing comprises said matching said targeting information associated with said asset to classification information associated with said network user and presenting said asset to said network user, said modifying comprises modifying said asset to change said active portion run-time by removing at least one of said plurality of frames, said plurality of frames comprises a plurality of I-frames, a plurality of B-frames, and a plurality of P-frames, and said modifying said asset to change said active portion run-time comprises removing at least one B-frame such that said active portion run-time is modified free from a perceptible alteration of informational content of said asset; and
   transmitting the modified asset to at least one network user.

2. The method of claim 1, further comprising:
   padding the modified asset, such that the modified asset has an asset run time at least equal to original value.

3. The method of claim 2, wherein padding the modified asset comprises adding neutral information to the modified asset.

4. The method of claim 3, wherein said neutral information comprises at least one of black video information and silent audio information.

5. The method of claim 3, wherein said neutral information is added to at least one end of the modified asset.

6. The method of claim 5, wherein said neutral information is added asymmetrically to the front and back of the modified asset.

7. The method of claim 6, further comprising asymmetrically padding said modified asset with said neutral information depending on a portion of said asset in a series of at least two assets for presentation during a scheduled asset presentation opportunity.

8. The method of claim 1, further comprising the step of providing one or more insertion points in the modified asset.

9. The method of claim 1, wherein modifying the asset comprises squeezing the asset to reduce its run-time.

10. The method of claim 9, wherein squeezing the asset comprises removing low-impact information from said informational content.

11. A method of targeting assets in a network having scheduled asset delivery windows, comprising:
providing a plurality of assets, each asset having associated targeting information and an original asset run-time;
comparing said targeting information to one or more characteristics of a network user;
selecting, based on said comparing step, an asset for delivery to said network user;
presenting said asset to said network user; and
obtaining, in connection with said presenting step, an asset having a reduced run-time to accommodate a processing time for said comparing and selecting steps such that a run-time of said asset having said reduced run-time and said processing time are at least equal to said original asset run-time,
wherein said asset comprises informational content, said run-time is reduced by squeezing said asset and by modifying information from said informational content free from a perceptible alteration of said informational content, said asset comprises a plurality of I-frames, a plurality of B-frames, and a plurality of P-frames, and said squeezing said asset by removing low-impact information includes removing at least one B-frame such that said run-time is modified free from said perceptible alteration of said informational content.

12. The method of claim 11, wherein said squeezing said asset further comprises padding at least one end of said asset with neutral information.

13. The method of claim 12, wherein said squeezing step further comprises creating an insertion point in said asset.

14. A method of targeting assets in a network having scheduled asset delivery windows, comprising:
providing a plurality of assets, each asset having associated targeting information and an original asset run-time;
comparing said targeting information to one or more characteristics of a network user;
selecting, based on said comparing step, an asset for delivery to said network user;
presenting said asset to said network user; and
obtaining, in connection with said presenting step, an asset having a reduced run-time to accommodate a processing time for said comparing and selecting steps such that a run-time of said asset having said reduced run-time and said processing time are at least equal to said original asset run-time,
wherein said asset comprises informational content, said run-time is reduced by squeezing said asset by modifying information from said informational content free from a perceptible alteration of said informational content, said asset is delivered to a user equipment device by inserting said asset into bandwidth designated for asset delivery and said step of presenting comprises operating said user equipment device associated with said network user to obtain said asset via said bandwidth based on said step of selecting, said asset comprises a plurality of I-frames, a plurality of B-frames, and a plurality of P-frames, and said squeezing said asset by removing at least one B-frame such that said run-time is modified free from said perceptible alteration of said informational content.

15. A method of targeting assets in a network having scheduled asset delivery windows, comprising:
providing a plurality of assets, each asset having associated targeting information and an original asset run-time;
comparing said targeting information to one or more characteristics of a network user;
selecting, based on said comparing step, an asset for delivery to said network user;
presenting said asset to said network user; and
obtaining, in connection with said presenting step, an asset having a reduced run-time to accommodate a processing time for said comparing and selecting steps such that a run-time of said asset having said reduced run-time and said processing time is at least equal to said original asset run-time,
wherein said asset comprises informational content, said run-time is reduced by squeezing said asset by modifying information from said informational content free from a perceptible alteration of said informational content, said asset is delivered to a user equipment device by broadcasting said asset on a first bandwidth segment of said network in synchronization with a scheduled asset presentation opportunity and said presenting step comprises switching said user equipment device associated with said network user from a second bandwidth segment of said network to said first bandwidth segment to present said asset, said asset comprises a plurality of I-frames, a plurality of B-frames, and a plurality of P-frames, and said squeezing said asset by removing at least one B-frame such that said run-time is modified free from said perceptible alteration of said informational content.

16. The method of claim 11, wherein said presenting step comprises:
receiving said asset at a user equipment device associated with said network user; and
operating said user equipment device to display said asset during an asset targeting opportunity.

17. A method of targeting assets in a network having scheduled asset delivery windows, comprising:
providing a plurality of assets, each asset having associated targeting information and an original asset run-time;
comparing said targeting information to one or more characteristics of a network user;
selecting, based on said comparing step, an asset for delivery to said network user;
presenting said asset to said network user; and
obtaining, in connection with said presenting step, an asset having a reduced run-time to accommodate a processing time for at least one of said comparing and selecting steps such that a run-time of said asset having said reduced run-time and said processing time is at least equal to said original asset run-time,
wherein said asset comprises informational content, said run-time is reduced by squeezing said asset by modifying information from said informational content free from a perceptible alteration of said informational content, operating said user equipment device to display said asset comprises retrieving said asset from memory at said user equipment device and inserting said asset into a programming stream, said asset comprises a plurality of I-frames, a plurality of B-frames, and a plurality of P-frames, and said squeezing said asset by removing at least one B-frame such that said run-time is modified free from said perceptible alteration of said informational content.

18. A method for use in targeting assets in a network having scheduled asset delivery windows, comprising:
providing a targeted asset system wherein an asset is selected for presentation to a network user during a given asset delivery window by matching targeting information associated with said asset to classification information associated with said network user, wherein said given asset delivery window has a fixed duration, and wherein said asset has an original duration equal to said fixed duration of said given asset delivery window;

receiving said asset having an active portion with an active portion run-time, wherein said active portion run-time is comprised of a plurality of frames; and modifying said original duration of said asset to accommodate a processing time for targeting related processing such that a duration of said modified asset duration and said processing time is at least equal to said original duration of said asset, wherein said targeting related processing comprises said matching said targeting information associated with said asset to classification information associated with said network user and presenting said asset to said network user, said modifying comprises modifying said asset to change said active portion run-time by removing at least one of said plurality of frames, said plurality of frames comprises a plurality of I-frames, a plurality of B-frames, and a plurality of P-frames, said modifying said asset to change said active portion run-time comprises removing at least one B-frame such that said run-time is modified free from said perceptible alteration of said informational content, and said active portion run-time is modified free from adjusting an output rate of said plurality of frames.

\* \* \* \* \*